(12) United States Patent
Breitenbacher et al.

(10) Patent No.: US 6,984,004 B2
(45) Date of Patent: Jan. 10, 2006

(54) METHOD AND DEVICE FOR CONTROLLING SOLENOIDS

(75) Inventors: Juergen Breitenbacher, Winterbach (DE); Andreas Klug, Untergruppenbach (DE); Alfred Strehle, Fellbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/387,793

(22) Filed: Mar. 12, 2003

(65) Prior Publication Data

US 2003/0214183 A1 Nov. 20, 2003

(30) Foreign Application Priority Data

Mar. 12, 2002 (DE) ............... 102 10 766
Jun. 21, 2002 (DE) ............... 102 27 785

(51) Int. Cl.
 *B60T 8/66* (2006.01)
 *G05D 13/04* (2006.01)
(52) U.S. Cl. ..................... 303/156; 137/47
(58) Field of Classification Search ........... 303/3, 303/15, 156; 701/71, 82, 78, 83; 137/47
 See application file for complete search history.

(56) References Cited

U.S. PATENT DOCUMENTS

| | | | | |
|---|---|---|---|---|
| 4,319,606 A | * | 3/1982 | Hoogenboom | ........... 137/625.3 |
| 5,190,068 A | * | 3/1993 | Philbin | ............... 137/8 |
| 5,647,645 A | * | 7/1997 | Muller et al. | ........... 303/119.2 |
| 5,662,388 A | * | 9/1997 | Wuerth et al. | ............... 303/3 |
| 5,752,751 A | * | 5/1998 | Nakaura et al. | ....... 303/122.06 |
| 6,273,525 B1 | | 8/2001 | Erban et al. | |
| 6,504,699 B1 | * | 1/2003 | Rader et al. | ............ 361/155 |

FOREIGN PATENT DOCUMENTS

| | | |
|---|---|---|
| DE | 196 20 037 | 11/1997 |
| DE | 195 25 538 | 1/1998 |
| DE | 19654427 | 6/1998 |
| DE | 19707960 | 9/1998 |
| DE | 197 12 889 | 10/1998 |
| DE | 19946348 | 3/2001 |
| DE | 10106464 | 1/2002 |

* cited by examiner

*Primary Examiner*—Xuan Lan Nguyen
(74) *Attorney, Agent, or Firm*—Kenyon & Kenyon

(57) ABSTRACT

A method and a device for controlling at least one valve of a brake circuit using an electrical control variable, in which
 a characteristic curve which characterizes the relationship between the pressure drop across the valve and the electrical control variable has at least one region in which a change in the electrical variable results in a change in the pressure drop; and
 a starting value for the electrical control variable is selected during actuation of the valve such that the starting value is in this region or at the boundary of this region.

8 Claims, 4 Drawing Sheets

METHOD AND DEVICE FOR CONTROLLING SOLENOIDS

FIELD OF THE INVENTION

The present invention is directed to a device and a method for controlling valves of a brake circuit.

BACKGROUND INFORMATION

German Patent Application No. 196 20 037 describes a method and a device for controlling a solenoid which includes a coil and a movable armature. To move the armature, a current and/or voltage is applied cyclically to the coil. By using different control modes, the solenoid may be optionally operated as an on-off valve or a pressure control valve.

German Patent Application No. 195 25 538 describes a control method and a control device for an anti-lock brake system (ABS) in which the pulsation of the brake pressure generated by the actuation of the inlet valve is minimized, noise and vibration are eliminated, and the response sensitivity of the brake pedal is improved. In the control device and control method, the signal waveform which opens and closes the inlet valves has a gently ascending and descending slope and does not completely open the brake lines, so that the pulsation of the brake pressure is suppressed.

SUMMARY OF THE INVENTION

The present invention is directed to a method of controlling at least one valve of a brake circuit using an electrical control variable. According to the present invention:

a characteristic curve which characterizes the relationship between the pressure drop across the valve and the electrical control variable has at least one region in which a change in the electrical variable results in a change in the pressure drop; and a starting value for the electrical control variable is selected during actuation of the valve such that the starting value is in this region or at the boundary of this region.

In this manner it is possible to precisely control the valve. The term "pressure drop" preferably refers to the difference between the pressure at the inlet side of the valve and the pressure at the outlet side of the valve.

One advantageous embodiment of the present invention is characterized by the fact that the starting value of the electrical control variable in at least one regulating cycle is selected as a function of the value of a valve variable or of the valve control variable in a previous regulating cycle.

This allows relevant values of the control variables detected or occurring during a regulating cycle to enter the next regulating cycle.

Another advantageous embodiment is characterized by the fact that the control variable of the valve in a previous regulating cycle is the current through the valve coil which causes the brake slip of the wheel to exceed a predetermined value.

The time at which the brake slip of the wheel exceeds a predetermined value is already determined by a conventional ABS controller.

One advantageous embodiment is characterized by the fact that the starting value for the electrical control variable is the value of the control variable at which a pressure build-up phase is initiated in the wheel brake cylinder associated with the valve. This enables the pressure build-up to be precisely controlled. In other words, the starting value is the value which initiates a pressure build-up phase.

Another advantageous embodiment is characterized by the fact that in a first phase the electrical control variable assumes a constant value; and the first phase precedes the pressure build-up phase.

One advantageous embodiment is characterized by the fact that during the pressure build-up phase the brake pressure in the wheel brake cylinder is increased until the brake slip of the wheel exceeds a predetermined value. In this manner the vehicle is prevented from skidding as the result of locked wheels.

Another advantageous embodiment is characterized by the fact that the electrical control variable is the current through a coil in the valve. The current represents a variable which is easily controlled electrically.

The device for controlling at least one valve of a brake circuit using an electrical control variable is advantageously characterized by means for selecting the starting value, in which a starting value for the electrical control variable is selected during actuation of the valve so that the starting value is in a valve actuation region or at the boundary of a valve actuation region; and a change in the electrical control variable in the valve actuation region resulting in a change in the pressure drop across the valve.

One advantageous embodiment is characterized by the fact that the device is used for controlling an inlet valve. In particular for inlet valves, a precise and carefully measured valve actuation is particularly important.

One advantageous embodiment is characterized by the fact that at least one actuated valve is a valve which regulates pressure drop. This valve exhibits as an inherent property the essentially linear relationship between coil current and the pressure drop across the valve.

DETAILED DESCRIPTION

A hydraulic brake system is known from German Patent Application No. 197 12 889 (corresponding to U.S. Pat. No. 6,273,525), for example.

Figure 1:
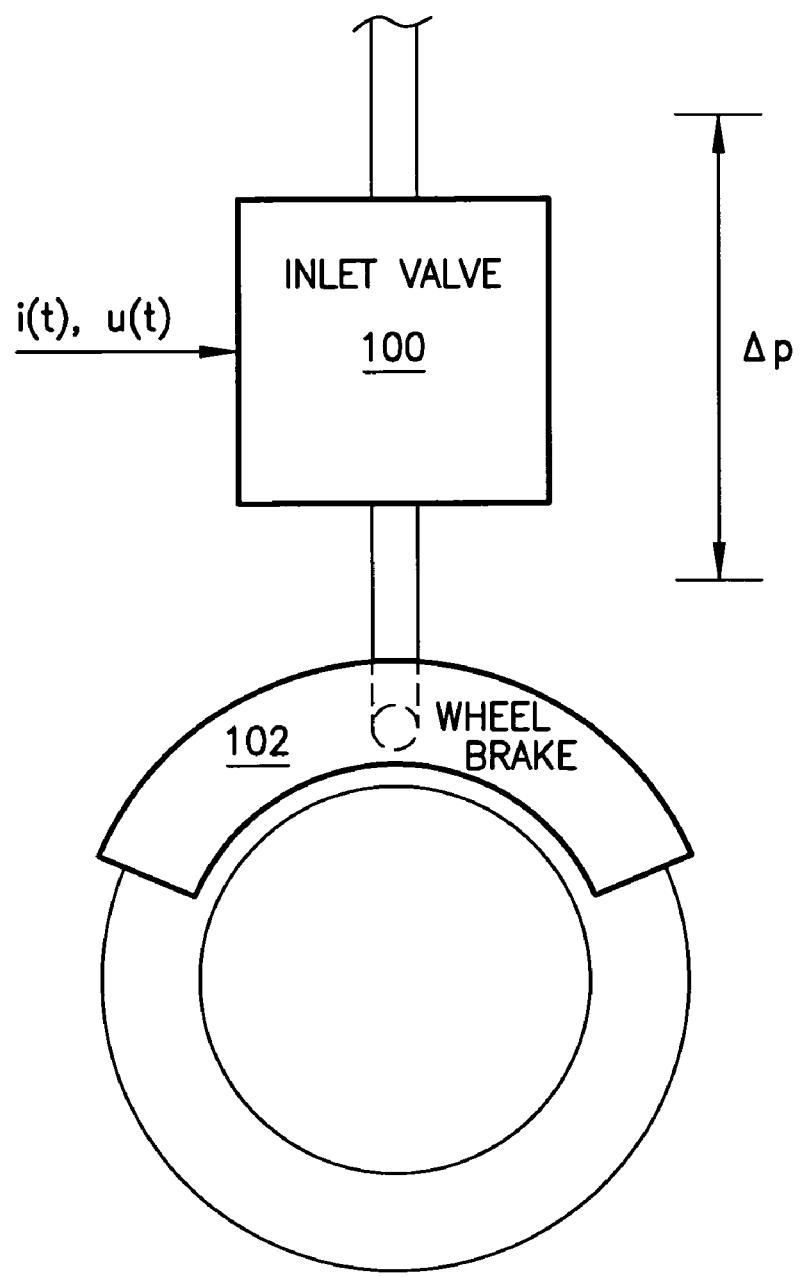
FIG. 1 shows the one wheel brake and an inlet valve in the form of a hydraulic block diagram.

FIG. 1 of the present application shows a detail of a hydraulic circuit.

An inlet valve is designated by block 100, the wheel brakes are designated by block 102, and the pressure drop across the inlet valve is designated by Δp. The inlet valve is actuated by a voltage u(t) or a current i(t).

In the present invention, the inlet valve is a valve which regulates pressure drop, i.e., it is a linear solenoid. Such a valve has the characteristic that the coil current through the inlet valve is proportional to pressure drop $\Delta p$ across the inlet valve. The inlet valve has the following two boundary states:

For a low coil current the inlet valve is open, and therefore $\Delta p=0$;

For a high coil current the inlet valve is closed, and brake fluid or brake medium does not flow through.

Pressure-regulating inlet valves may be characterized by two important properties:

1. A static relationship between the application of current to the valve and the adjusted pressure drop (i–$\Delta p$ characteristic curve); and
2. A dynamic transient response. This may be described fairly well by a first-order time-delay element, the time constant being a function of the associated hydraulic volume.

Figure 2:
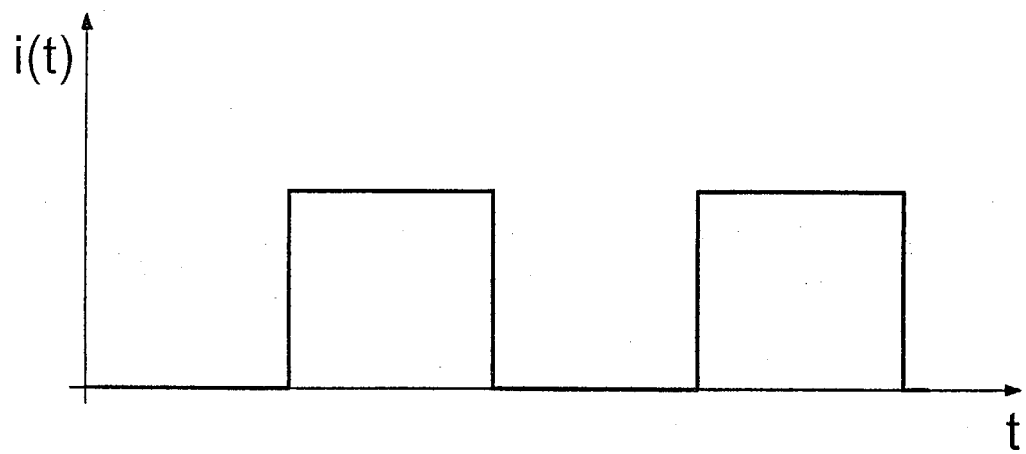
FIG. 2 shows a cyclical actuation of the inlet valve.

A cyclical operating mode of such a valve is illustrated in FIG. 2. Time t is represented by the x axis and current i(t) is represented by the y axis. Current i(t) alternates between a low and a high value, and the inlet valve correspondingly alternates between the open and closed states, resulting in adverse effects such as noise production and high mechanical load on the valve.

Figure 3:
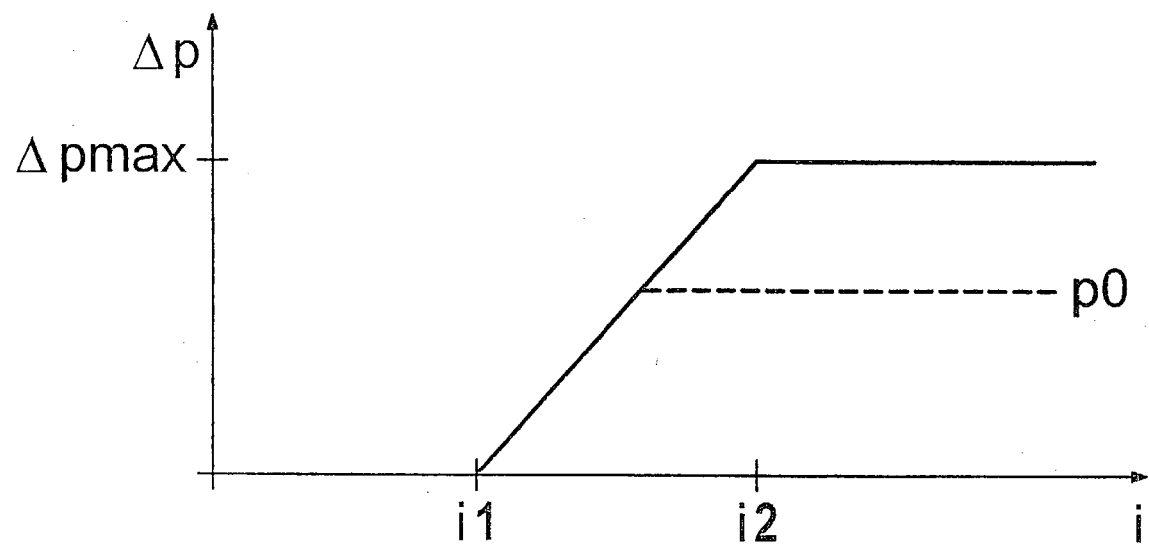
FIG. 3 shows in general form the actuation of an inlet valve.

The characteristic i–$\Delta p$ characteristic curve of an inlet valve is illustrated in FIG. 3. Current i through the coil in the inlet valve is represented along the x axis, and pressure drop $\Delta p$ by which the inlet valve is adjusted is represented along the y axis. For small currents $0<i<i1$, the valve is open and therefore $\Delta p=0$. Between i1 and i2 the increase in $\Delta p$ is approximately linear. The maximum controllable pressure drop $\Delta p$ across the inlet valve is reached at current i2.

The filling of the wheel brake cylinder with the brake fluid and thus the generation of braking pressure is explained with reference to FIG. 3.

First, it is assumed that the inlet valve is closed and pressure p0 is applied between the inlet valve opening and the wheel brake cylinder.

A current i>i2, for example, flows.

The pressure in the wheel brake cylinder is then increased. This occurs when the inlet valve is opened.

Current i is decreased in a ramped manner over time, starting at value i2. In FIG. 3 the state then moves to the left along the dashed line.

Pressure drop $\Delta p$ across the inlet valve decreases until that value of the current is reached at which the dashed line intersects the solid line denoting the characteristic curve of the inlet valve.

The state of the inlet valve then moves along the characteristic curve toward point $\Delta p=0$. It is not absolutely necessary that this point be reached. This graphically demonstrates that the current as well as the pressure drop decrease over time. The sufficiently slow cutback in the current causes the valve to operate in static equilibrium. This means that the valve is always in a statically steady state, and the state of the valve moves along the characteristic curve illustrated in FIG. 3.

The inlet valve opens, and the pressure in the wheel brake cylinder continuously increases.

This opening process may be accomplished by a linearly decreasing current ramp, for example.

The movement of the valve state along the characteristic curve means that the inlet valve is operated solely in the statically steady state while pressure is building up in the wheel brake cylinder. In physics, such an operating mode is also referred to as "adiabatic": the opening process passes through a sequence of static states.

In this regard it is not important whether power is applied to the valve by current selection or by voltage selection, either continuously or by pulse-pause actuation.

However, the pulse-pause actuation should be of sufficiently high frequency that the pressure-drop regulating valve cannot follow the high-frequency switching operation, but, rather, can only follow the average value of the pulse-pause actuation. Thus, use is made of the physical characteristic that the coil current cannot change abruptly.

In addition to the improved switching action, the present invention has the additional advantage that through the i–$\Delta p$ characteristic curve the pressure drop $\Delta p$ is also known when the current is known. This additional information $\Delta p$ is also provided for ABS, ESP (Electronic Stability Program), or TCS (Traction Control System).

When the above-described regulation is applied via the i–$\Delta p$ characteristic curve, in addition to the time of the pressure build-up, the question arises concerning which current is used to actuate the valve at the beginning of the pressure build-up. There are two possibilities in this regard:

1. In many vehicle dynamics regulating systems (ESP, for example), the admission pressure in the braking circuit is known via the sensor system present in the vehicle. Using a wheel pressure model, it is possible to calculate the instantaneous brake pressure in the wheel brake cylinder. With the information on the admission pressure and the instantaneous brake pressure in the wheel brake cylinder, it is possible to calculate the instantaneous pressure drop across the inlet valve. This may be used to determine the required opening current via the i–$\Delta p$ characteristic curve.

2. In many systems (for example, in many ABS systems) the admission pressure in the braking circuit is not known. The remedy provided in this case, making use of the pressure-drop-regulating characteristics of the inlet valve (also without knowledge of the admission pressure), is described below.

Figure 4:
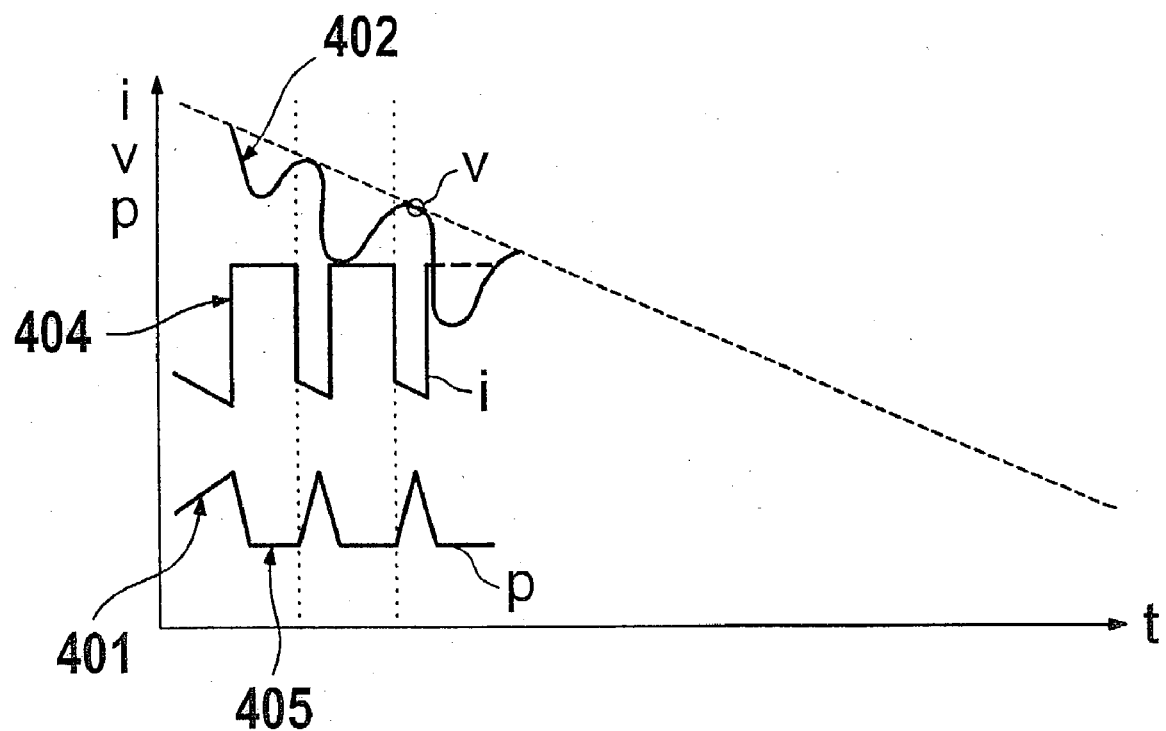
FIG. 4 shows the valve response and the response of the vehicle wheel during an actuation of the valve under actuation currents that are too high and too low.
Figure 4:
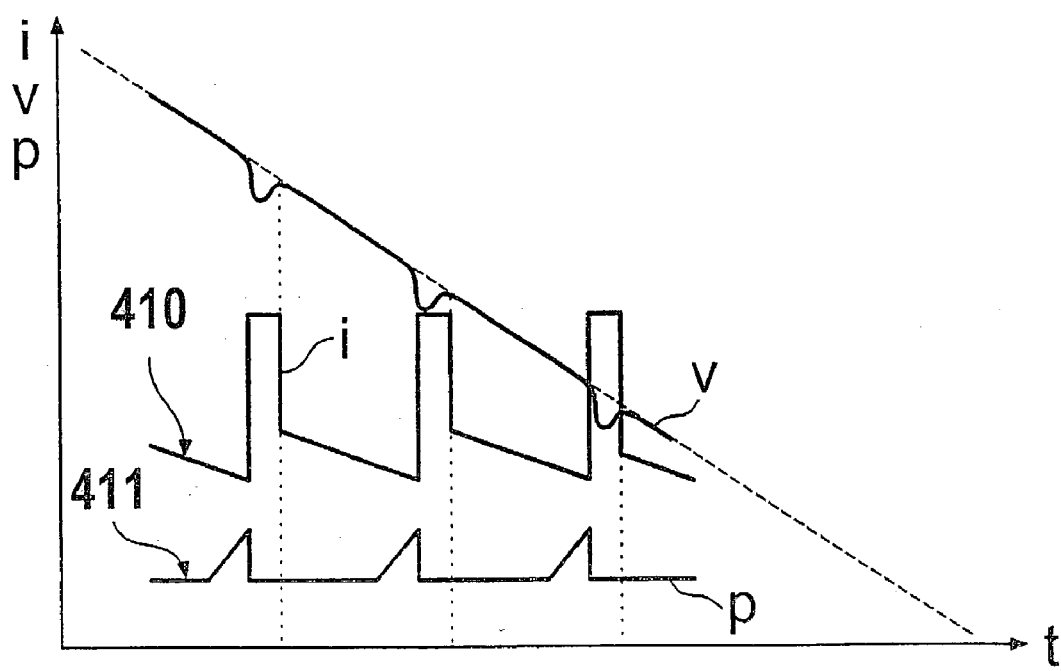

In the ESP and ABS systems under consideration, a pressure build-up always occurs following a phase of pressure maintenance; i.e., a phase with constant pressure in the wheel brake cylinder always precedes a pressure build-up phase (in the wheel brake cylinder). In the pressure maintenance phase the power applied to the valve is unimportant, provided that the current is at least high enough to close off the inlet valve. Immediately at the beginning of the pressure build-up, a valve current must be set which corresponds to the existing instantaneous pressure drop. If the value of the current is incorrect, the two following cases result:

Case 1:

If the current is too low (i.e., the pressure across the inlet valve drops very rapidly), a pressure build-up with undesirably large build-up gradients occurs. This results in erratic regulation, which in turn results in a large wheel slip and difficulty in steering the vehicle. This situation is illustrated in the upper diagram in FIG. 4. Time t is plotted on the x axis, and valve current i, wheel circumferential speed v, and pressure p in the corresponding wheel brake cylinder are plotted on the y axis. Immediately after the current is switched on, as shown at point 401, a rapid pressure build-up takes place. This results in a correspondingly steep drop in the wheel circumferential speed (402) and consequently in a response by the ABS control. The ABS control abruptly increases the current through the inlet valve (404). This results in the closing of the inlet valve. Thus, the pressure in the wheel brake cylinder no longer rises. Opening the corresponding outlet valve causes the pressure to build up (very slowly) in the wheel brake cylinder.

Case 2:

If the current is too high, the pressure build-up is delayed until the valve current (and thus the maximum blockable pressure drop) and the pressure drop are in equilibrium. At this time the braking force is too small, and the vehicle does not have optimal deceleration. This is graphically illustrated in the lower diagram in FIG. 4, where the axes and curves are analogous to those in the upper diagram. Current i is too large (arrow 410), so that pressure drop $\Delta p$ is maintained for too long and does not immediately decrease. The brake pressure in the wheel brake cylinder, therefore, increases too late (see arrow 411).

Figure 5:
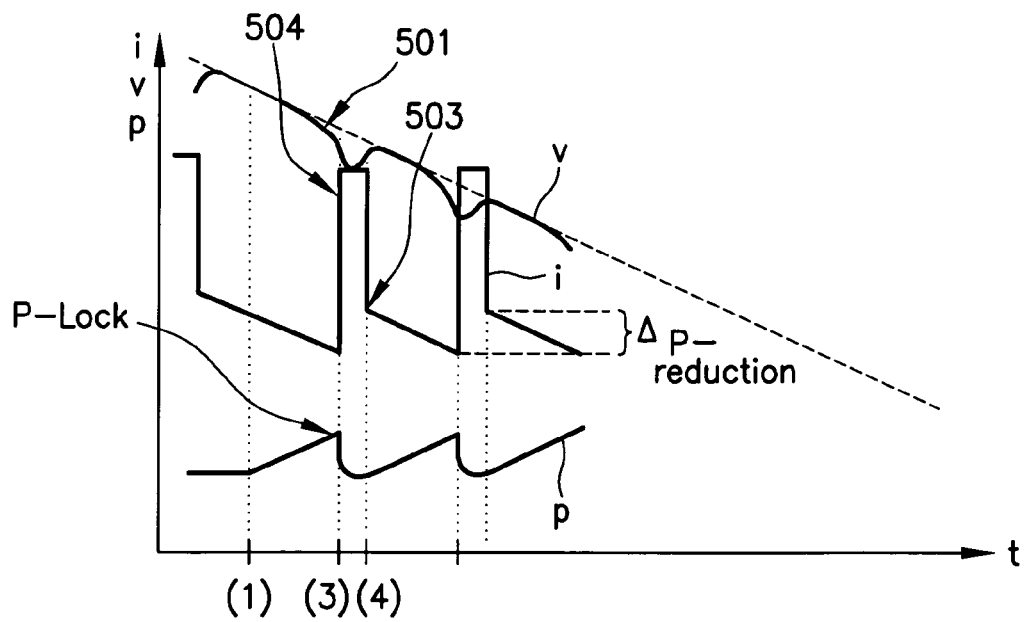
FIG. 5 shows the valve response and the response of the vehicle wheel during the actuation according to the present invention.

One possible alternative actuation of the inlet valve is illustrated in FIG. 5. The axes are designated as in FIG. 4. The actuation process proceeds according to the following steps:

Step 1:

Following a pressure maintenance phase, the current, starting at an initially excessive value, is decreased in a ramped manner. The forces acting on the valve reach equilibrium at the point designated by (1) on the time axis, and the pressure build-up begins here. This can be seen by the rise in pressure p in the wheel brake cylinder in the lowest of the illustrated curves.

It should be emphasized that it is not possible to observe this point in time in a system that does not have wheel pressure sensor technology.

Step 2:

The current is further reduced, with a gradient which conforms to the pressure build-up requirements of the ABS controller (determined via the i–$\Delta p$ characteristic curve), but slowly enough so that the inlet valve (as described above) is always in the statically steady state. This phase takes place along the time axis between illustrated times (1) and (3).

Step 3:

As previously mentioned, the decrease in the current results in a pressure increase in the wheel brake cylinder (see the rise in p in FIG. 5), resulting in increasing instability of the wheel. This is manifested by the rapid drop in the wheel circumferential speed, as illustrated by the curve designated by v in FIG. 5. Thus, the curve for wheel circumferential speed (v) grows increasingly farther from the (dashed-line) curve for the vehicle's longitudinal speed (illustrated by the dashed straight line), as can be seen at point 501, for example. Wheel circumferential speed v becomes increasingly lower with respect to the vehicle's longitudinal speed, which graphically illustrates the increasing brake slip of the wheel.

The point of maximum longitudinal force is reached at time (3), and the wheel brake cylinder is acted on by locking pressure p_lock. At the same time, pressure drop $\Delta p$_instab decreases at the inlet valve. Although the value of locking pressure p_lock is not known, at time (3) the following relationship is valid for pressure drop $\Delta p$_instab across the inlet valve:

$$\Delta p\_instab = p\_hz - p\_lock$$

where p_hz is the pressure in the brake master cylinder. The current associated with pressure drop $\Delta p$_instab is known, and therefore pressure drop $\Delta p$_instab is known via the i–$\Delta p$ characteristic curve.

Step 4:

In the following discussion, the pressure is reduced due to the instability of the wheels. This pressure reduction lasts until the observed wheel dynamics show that the wheel is once again stable, i.e., when the slip drops below a threshold value. The pressure is reduced by closing the inlet valve (via a high valve current, achieved by rapid current increase 504 in FIG. 5) and opening the outlet valve. A pressure maintenance phase then occurs between times (3) and (4) (inlet valve and outlet valve closed) until the intended time for a new pressure build-up is reached. This is time (4) in FIG. 5. At this time the wheel response is once again stable.

Step 5:

For the new pressure build-up, it is first necessary to determine the starting value of the current (503 in FIG. 5). The following assumptions are made in determining this starting value:

The coefficient of friction of the roadway and thus the locking pressure was essentially constant during the last regulating cycle.

The admission pressure was essentially constant during the last regulating cycle.

The reduction in the pressure drop across the inlet valve by the amount $\Delta p$_reduction, which is necessary for stabilization of the wheel, is essentially constant and independent of the coefficient of friction. As illustrated in FIG. 5, value $\Delta p$_reduction represents the pressure difference between the point at which static operation of the inlet valve begins and the point at which static operation of the inlet valve ends. Variable $\Delta p$_reduction is associated with current curve i in FIG. 5. This is explained by the fact that during static operation of the inlet valve a linear relationship exists between current i and pressure drop $\Delta p$ across the valve.

Thus, the pressure drop across the inlet valve at the beginning of the pressure build-up may be determined using the equation $$\Delta p\_start = \Delta p\_instab + \Delta p\_reduction$$

In this formula it is understood that $\Delta p$_instab is the pressure drop across the valve when instability arises; and $\Delta p$_reduction is the pressure difference by which the pressure drop across the valve at the beginning of the regulating cycle was reduced as a result of the valve opening process.

The starting value of the current during pressure build-up is obtained once again from the i–$\Delta p$ characteristic curve. Thus, at the beginning of the pressure build-up in the wheel brake cylinder the described method allows the current to jump fairly accurately to that value which, when the current is subsequently reduced, immediately results in a reduction in the pressure drop across the valve.

Figure 6:
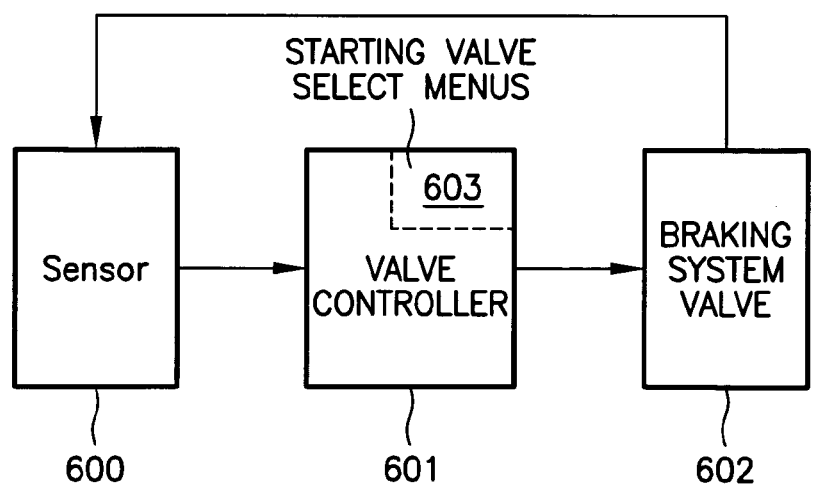
FIG. 6 shows the design of the device according to the present invention and its incorporation into the vehicular environment.

The design of the device according to the present invention and its incorporation into the vehicular environment are illustrated in FIG. 6. Block 600 contains sensor means which detect, for example, the pressure in brake master cylinder p_hz or the wheel speed. Block 602 contains the controlling means for the braking system, in particular the actuated valve. The device for controlling the valve is contained in block 601. Means 603 for selecting the starting value are contained in block 601. The output signals from sensor means 600 are fed to the device for controlling the valve. The output signals from block 600 are fed to controlling means 601. Feedback from the controlling means is provided to the sensor means, for example by detecting the electrical current flowing in a valve coil.

What is claimed is:

1. A method of controlling at least one valve of a brake circuit using an electrical control variable, the method comprising:
    providing a characteristic curve which characterizes a relationship between a pressure drop across the valve and the electrical control variable, the characteristic curve having at least one region in which a change in the electrical control variable results in a change in the pressure drop; and
    selecting a starting value for the electrical control variable during actuation of the valve such that the starting value is one of: (a) in the at least one region and (b) at a boundary of the at least one region;
    wherein the starting value in at least one regulating cycle is selected as a function of a value of a valve control variable in a previous regulating cycle;
    and wherein the valve control variable in a previous regulating cycle is a current through a coil in the valve which causes a brake slip of a wheel to exceed a predetermined value.

2. The method according to claim 1, wherein the starting value is a value of the control variable at which a pressure build-up phase is initiated in a wheel brake cylinder associated with the valve.

3. The method according to claim 2, wherein in a first phase the control variable assumes a constant value, the first phase preceding the pressure build-up phase.

4. The method according to claim 2, wherein during the pressure build-up phase a brake pressure in a wheel brake cylinder is increased until a brake slip of a wheel exceeds a predetermined value.

5. The method according to claim 1, wherein the control variable is a current through a valve coil.

6. A device for controlling at least one valve of a brake circuit using an electrical control variable, the device comprising:
    means for selecting a starting value for the electrical control variable during actuation of the valve such that the starting value is one of (a) in a valve actuation region and (b) at a boundary of the valve actuation region, a change in the electrical control variable in the valve actuation region resulting in a change in a pressure drop across the valve;
    wherein the starting value in at least one regulating cycle is selected as a function of a value of a valve control variable in a previous regulating cycle;
    and wherein the valve control variable in a previous regulating cycle is a current through a coil in the valve which causes a brake slip of a wheel to exceed a predetermined value.

7. The device according to claim 6, wherein the device is used for controlling an inlet valve.

8. The device according to claim 6, wherein the at least one valve includes a pressure-drop regulating valve.

* * * * *